Patented Aug. 16, 1949

2,479,111

UNITED STATES PATENT OFFICE 2,479,111

PRODUCTION OF HYDROGEN PEROXIDE BY THE PARTIAL OXIDATION OF ALCOHOLS

Charles Roberts Harris, Lockport, N. Y., assignor to E. I. du Pont de Nemours & Company, Wilmington, Del., a corporation of Delaware No Drawing. Application June 29, 1945, Serial No. 602,418

11 Claims. (Cl. 23—207)

This invention relates to a novel method for manufacturing peroxides. More particularly, it relates to a method for manufacturing hydrogen peroxide and other peroxides involving the incomplete oxidation of primary and secondary alcohols in vapor phase. Aldehydes and ketones are also obtained in high yields as products of the oxidation.

It is well known that primary and secondary alcohols can be catalytically oxidized to produce high yields of the corresponding aldehydes and ketones with water being a second product of the reaction:

$$RCH_2OH + \tfrac{1}{2}O_2 \rightarrow RCHO + H_2O$$

It is likewise known that alcohols can be oxidized noncatalytically to produce products giving tests for aldehydes, acids, and organic peroxide (Ann. Chim. (10) 15, 309–422 (1931)).

The auto oxidation of alcohols activated by ultraviolet light to produce a variety of organic peroxides is disclosed in United States Patents 2,115,206 and 2,115,207. These peroxides are described as being relatively stable and can be isolated by distilling off the unchanged alcohol.

I have discovered a method whereby primary and secondary alcohols can be oxidized to produce hydrogen peroxide and the corresponding aldehydes or ketones as the major products of the reaction. It is an object of my invention, therefore, to react a primary or secondary alcohol with air or oxygen in a manner to produce high yields hydrogen peroxide and the corresponding aldehyde or ketone. A further object is an improved and economical process for producing hydrogen peroxide and other peroxides. Other objects will appear from the following description of my invention.

In accordance with my invention a primary or secondary alcohol is reacted with oxygen or an oxygen containing gas in the vapor phase in the absence of a catalyst under special and carefully controlled conditions which are necessary to accomplish the objects of the invention. The reaction temperature may vary over the range of about 350 to 500° C., depending upon the alcohol and the exposure time. For a given alcohol and exposure time, however, the temperature must be controlled between very narrow limits.

Although the space velocity or exposure time may vary widely, depending upon the alcohol and the temperature, it must be carefully regulated for any given set of conditions so that not more than about 90 per cent of the oxygen present is permitted to react. I prefer to operate at such space velocity or exposure time that from 10 to 80 per cent of the oxygen passes through unreacted. For this purpose the exposure time may vary over a range preferably of 0.5 second to 1 minute (calculated at N. T. P.) or even over a wider range, depending upon the alcohol and temperature. In general the percentage of undesirable by-products formed is greater as the percentage of oxygen reacted is increased.

In accomplishing the objects of my invention, it is necessary to operate with an excess of alcohol over oxygen in the gas mixture. Thus, the volume ratio of alcohol vapor to oxygen should be at least 2:1 and may be as high as 50:1. I prefer to operate with a ratio of from 5:1 to 10:1, depending somewhat upon the purity of the oxygen employed. Thus if employing air as the oxidizing gas, very good results are obtained with a 1:1 air-alcohol vapor mixture or an alcohol oxygen ratio of 5:1. On the other hand, if pure oxygen is employed, it is preferable to operate at a higher alcohol-oxygen ratio, for example 10:1. The oxygen should not exceed 20 per cent by volume of the feed gas mixture, and if an inert gas such as nitrogen is present, the ratio of inert gas to oxygen should not exceed about 10:1. In this connection, water vapor acts as an inert gas in the reaction and should be so considered in calculating the ratio of inert gas to oxygen.

The reaction vessel should be kept as far as possible free from substances adversely affecting the stability of the hydrogen peroxide, such as iron, copper, nickel, and other heavy metals. This is especially true where the reaction is carried out on a small scale, where the surface-volume ratio of the reactor is large. In this case it is preferable to use a reaction vessel made of glass, quartz, or enameled metal. Acidic enamels, e. g., fused coatings of boric acid or boric oxide, are especially suitable. For large reaction vessels having low surface-volume ratios, the surface material becomes of less importance, and nonrusting metals or alloys, e. g., aluminum and stainless steels, can be used to good advantage. When using such metals, however, it is preferable that they be coated with an acidic enamel. One method of operation that can be advantageously employed in large-scale operation is to preheat the reactants separately to a sufficient temperature so that reaction will be initiated when they are mixed. The gases are then mixed and introduced into a reaction vessel of stainless steel or other suitable metal, the walls of which are cooled to 100–200° C. In this way the reaction proceeds without adverse catalytic effect from the walls of the vessel.

Since hydrogen peroxide is rapidly decomposed at high temperatures into oxygen and water and may also react to oxidize the aldehyde or ketone formed or further quantities of the alcohol, it is necessary that the product be chilled as rapidly as possible to a temperature of 100° C. or lower to prevent loss of product through decomposition and further oxidation.

The hydrogen peroxide in the product gas may be separated and partially purified by partial condensation and fractionation, or liquid products may be totally condensed and the peroxide purified by distilling off the alcohol, aldehyde, or ketone under reduced pressure. To avoid the hazard of explosion which may result from concentrating the peroxide too highly, especially in contact with organic material when purifying it in this manner, I may add sufficient water to the condensed product so that after distilling off volatile organic compounds, the strength of aqueous peroxide remaining in the still pot will not exceed 40 to 50 per cent by weight of hydrogen peroxide.

In a preferred mode of carrying out my invention, I react air with a mixture of alcohol and water vapors under the conditions described above, condense the off gases, add more water to the condensate, and distill the condensate. The products from fractional distillation are alcohol and water vapor and carbonyl compound (aldehyde or ketone), which are collected separately. The still residue is an aqueous hydrogen peroxide solution. The fraction or fractions containing alcohol or an azeotropic mixture of alcohol and water vapor, after condensation, are recycled to the oxidation reaction. This method may be carried out as a continuous process.

Other methods of recovering the peroxide or of utilizing the active oxygen may be employed. Thus, where the organic materials involved have limited water solubility, the peroxide may be extracted with water. Calcium hydroxide may be added to the crude condensed product to precipitate calcium peroxide in good yield and other insoluble inorganic peroxides may be obtained in a similar manner. In some instances it is preferable to distill off the aldehyde or ketone before carrying out the precipitation. The crude product solutions containing peroxide and ketone or aldehyde may also be employed for producing ketone and aldehyde peroxides by adding mineral acids or other catalysts to the solution.

The yield of peroxide on alcohol introduced may be increased by recovering the unreacted alcohol and reusing it in the oxidation process. Many of the alcohols form azeotropic mixtures with water and will be most easily recovered from the crude product in admixture with water. Water, even in relatively large amounts, does not interfere with the oxidation reaction, and so it is not necessary to separate the alcohol from water before reusing it in the process.

Any primary or secondary alcohol may be utilized in practicing my invention, those alcohols containing from 1 to 10 carbon atoms being especially useful. The alcohol may be monohydric or polyhydric, saturated or unsaturated (olefinic or acetylenic), cycloaliphatic or acyclic. Specific examples of suitable alcohols are: methanol, ethanol, propanol, n-butanol, sec-butanol, heptyl alcohol, cetyl alcohol, decanol, allyl alcohol, crotyl alcohol, propargyl alcohol, ethylene glycol, 1,2-propanediol, glycerol, 1,4-butanediol, 1,4-butinediol, and cyclohexanol, cyclohexenol, furfuryl alcohol.

My invention is further illustrated by the following examples:

Example 1

A gas mixture consisting of 50 per cent by volume air, 33.5 per cent isopropyl alcohol, and 16.5 per cent water vapor (representing the vaporized isopropyl alcohol-water azeotrope) is continuously fed to a reaction chamber in which the maximum temperature is maintained at 450 to 460° C. The gas feed rate is regulated to give an exposure time of 30 seconds calculated at normal temperature and pressure. Under these conditions approximately 50 per cent of the oxygen passes through unreacted and about 80 per cent of the reacted oxygen is converted into hydrogen peroxide. The product gas is led through a condenser and the condensed product collected in a receiving vessel where water is added at the rate of approximately 0.1 lb. of water per pound of alcohol fed to the reactor. The gas is then passed through a charcoal absorber to recover the uncondensed alcohol and acetone carried by the gas. The product from the receiver which consists of a mixture of isopropyl alcohol, acetone, hydrogen peroxide, and water with only very minor portions of other constitutents is transferred to a suitable still provided with a fractionating column, and the acetone and isopropyl alcohol-water azeotrope are stripped off at approximately 100 mm. absolute Hg pressure and collected separately. The still residue consists of a clear, colorless aqueous solution of hydrogen peroxide containing 25 to 30 per cent by weight hydrogen peroxide. The recovered isopropyl alcohol-water azeotrope containing approximately 88 per cent by weight alcohol and 12 per cent water is returned to the alcohol feed tank from which it is metered to a vaporizer, the vapors mixed with an equal volume of air and thus again passed through the reactor. In this manner 0.7 mol of hydrogen peroxide and 0.9 mol of acetone are recovered per mol of isopropyl alcohol introduced into the system.

Example 2

The reaction vessel consisted of a 1.4 inch i. d. x 30 inch Pyrex tube which was supported vertically in a 24 inch electrically heated furnace. The tube contained a removable thermocouple encased in a Pyrex well extending down the center of the tube. The bottom of the reaction tube was drawn down and sealed to a 15 inch length of 10 mm. i. d. Pyrex tube which was encased in a water jacket for cooling the product gas. The end of the 10 mm. tube extended into a Pyrex receiving flask in such a way that product gas would bubble through a small pool of distilled water contained therein. The receiving flask was immersed in ice water for cooling. All glass was rinsed with concentrated nitric acid and then with distilled water before use.

A mixture of equal volumes of air and isopropyl alcohol vapor was introduced into the top of the reaction tube at total gas rate of 600 cc. per minute (volume calculated at N. T. P.), and the temperature at the hottest point in the tube was adjusted at 485° C. Analysis of the product gas after passing the cooler and receiving flask showed that 45.8 per cent of the oxygen fed had reacted in passing through the system. The product collected in the receiving flask over a 10-minute period was found to contain 0.36 gram of hydrogen peroxide and 0.72 gram of ketone calculated as acetone. This represents a yield of 81 per cent of the theory of hydrogen peroxide and 97 per cent of the theory of acetone based upon the amount of oxygen reacted according to the following equation:

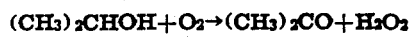

$(CH_3)_2CHOH + O_2 \rightarrow (CH_3)_2CO + H_2O_2$

*Example 3*

A crude product solution obtained as in Example 2, weighing 91.4 grams and containing 4.03 grams of hydrogen peroxide and 10.42 g. of acetone as indicated by analysis, was diluted with 115 grams of water and charged into a glass still provided with a glass packed fractionating column. The unreacted alcohol and acetone were distilled off at 100 mm. absolute Hg pressure. The residue remaining in the flask was clear, colorless, odorless, and was found to contain 3.79 grams of hydrogen peroxide or 94 per cent of that charged to the still. The distillate contained 9.35 grams of acetone which was separated from the alcohol-water mixture by a second fractional distillation at atmospheric pressure.

*Example 4*

To 16 grams of a peroxide solution, obtained as in Example 3 and containing 2.01 grams of hydrogen peroxide, as indicated by the KI-thiosulfate method, was added 47 grams of an aqueous solution containing an equivalent amount of sodium metaborate. The solution was stirred constantly and maintained at 5° C. during the addition. The resulting mixture was filtered to separate the precipitated sodium perborate tetrahydrate. The dried product contained 10 per cent by weight active oxygen (theory 10.4). The yield was 76 per cent of theory based upon the initial peroxide employed.

*Example 5*

To 50 cc. of crude product solution, obtained as in Example 2 and containing 2.4 grams of hydrogen peroxide, as indicated by analysis, was added an aqueous suspension of the theoretical equivalent of $Ca(OH)_2$. The precipitated calcium peroxide was filtered off and recovered in yield of 80 per cent of theory based upon the initial peroxide employed.

*Example 6*

A gas mixture consisting of equal volumes of air and isobutyl alcohol vapor was passed through the reactor described in Example 2 at a total gas rate of 400 cc. per minute and with the temperature at the hottest point in the reactor at 452-458° C. Analysis of the product gas indicated 60.6 per cent of oxygen reacting in passing through the reactor. The peroxide found in the solution in the receiving flask was equivalent to a yield of 89.5 per cent of the theory based on oxygen reacted.

*Example 7*

Secondary butyl alcohol was employed in place of isobutyl alcohol and the oxidation carried out as in Example 6. The total gas rate was 400 cc./minute and the temperature 456 to 458° C. 63 per cent of the oxygen was reacted, and the peroxide yield was 65 per cent of theory based on oxygen reacted.

The product solution from this experiment was diluted with water and the ketone and unreacted alcohol stripped off by vacuum distillation. The material charged to the still contained 5.37 grams of hydrogen peroxide by analysis, and the still residue, which was a colorless, clear solution, contained 4.51 grams of hydrogen peroxide, representing an 84 per cent recovery. (This solution gave no test for aldehydes or ketones.) The solution charged to the still contained 30.4 grams of ketone, and 28.83 grams was recovered in the distillate or a recovery of 95 per cent.

By adding a solution of sodium metaborate to the peroxide solution, 68 per cent of the peroxide was recovered as pure sodium perborate tetrahydrate.

*Example 8*

Ethyl alcohol was oxidized as in the previous example, employing a gas mixture consisting of equal volumes of air and alcohol vapor. The total gas rate was 400 cc./minute and the temperature 481° C. 75 per cent of the entering oxygen was reacted. The peroxide yield was 57 per cent of the theory, while the yield of acetaldehyde was 70 per cent of theory based on oxygen reacted.

Product solution obtained as above was diluted with water and subjected to fractional distillation to strip off acetaldehyde and unreacted alcohol. The solution charged to the still contained 5.61 grams of hydrogen peroxide and 10.35 grams of aldehyde determined by the sodium sulfite method calculated as acetaldehyde. The stripping operation yielded as still residue a clear, colorless solution containing 5.16 grams of peroxide determined by the KI-thiosulfate method and calculated as hydrogen peroxide, representing a 92 per cent recovery of the peroxide charged. The distillate contained 7.4 grams of aldehyde, giving a recovery of 74.4 per cent of the aldehyde charged. Addition of sodium metaborate to the peroxide solution gave a yield of 73 per cent of pure sodium perborate tetrahydrate.

*Example 9*

Allyl alcohol was oxidized as in the previous examples, employing a gas mixture of equal volumes of air and alcohol vapor, a total gas rate of 400 cc./minute and a reaction temperature of 430-438° C. 62.5 per cent of the entering oxygen reacted. The yield of peroxide was 40 per cent calculated as hydrogen peroxide. 2.6 mols of aldehyde (acrolein) was obtained for each mol of peroxide.

*Example 10*

Cyclohexanol was oxidized by the procedure of previous examples employing a mixture of equal volumes of air and cyclohexanol vapors. The total gas rate was 400 cc./minute and the temperature 350-360° C. 78 per cent of the oxygen reacted. Analysis indicated the product gas to contain 1 per cent by volume hydrogen peroxide and 7.6 per cent by volume cyclohexanone.

*Example 11*

The isopropyl alcohol-water azeotropic mixture containing 12 per cent by weight water and representing the alcohol water mixture recovered by fractional distillation of the crude product from a previous experiment (see Example 4) was oxidized as in Example 2. The feed gas mixture contained approximately 35 per cent (by volume) isopropyl alcohol vapor, 16 per cent water vapor, 9.8 per cent oxygen, and 39 per cent nitrogen. The reaction temperature was 482–487° C. 50 per cent of the oxygen reacted to give 0.6 mol of peroxide and 0.96 mol of acetone per mol of oxygen reacted.

For comparison a run was made under the same conditions, employing pure isopropyl alcohol, the feed gas mixture containing approximately equal volumes of isopropyl alcohol vapor and air. 48.6 per cent of the entering oxygen reacted. 0.61 mol of peroxide and 1.04 mols of acetone was produced for each mol of oxygen that reacted.

*Example 12*

Isopropyl alcohol was oxidized as in Example 2, employing a gas mixture consisting of 76 per cent isopropyl alcohol vapor and 24 per cent air at a reaction temperature of 418–428° C. Analysis of the product gas showed it to contain 3.72 per cent by volume peroxide and 3.95 per cent acetone. It contained no CO or $CO_2$ and only 0.3 per cent unsaturated hydrocarbon (propylene).

I claim:

1. The process for the production of hydrogen peroxide which comprises mixing oxygen with the vapor of an alcohol selected from the group consisting of primary and secondary alcohols in the proportion of one volume of oxygen to from 2 to 50 volumes of said alcohol and causing the mixture to react at a temperature of about 350 to 500° C. under conditions such that not more than about 90 per cent of the oxygen in said reaction is reacted.

2. The process for the production of hydrogen peroxide which comprises mixing oxygen with the vapor of an alcohol selected from the group consisting of primary and secondary alcohols in the proportion of one volume of oxygen to from 2 to 10 volumes of said alcohol and causing the mixture to react at a temperature of about 350 to 500° C. under conditions such that 10 to 80 per cent of the oxygen in said reaction is reacted.

3. The process which comprises forming a gaseous mixture containing oxygen and the vapor of an alcohol selected from the group consisting of primary and secondary alcohols, said mixture containing 2 to 50 volumes of alcohol vapor for each volume of oxygen present, the quantity of oxygen present not exceeding 20 per cent by volume of said mixture and the volumetric ratio of any inert gas (including water vapor) present to oxygen in said mixture not exceeding 10:1, flowing said mixture through a reaction space at a temperature of 350 to 500° C. at such rate that not more than about 90 per cent of said oxygen is reacted, condensing effluent vapors to obtain a liquid product and recovering hydrogen peroxide from said product.

4. The process which comprises forming a gaseous mixture containing oxygen and the vapor of an alcohol selected from the group consisting of primary and secondary alcohols, said mixture containing 5 to 10 volumes of alcohol vapor for each volume of oxygen present, the quantity of oxygen present not exceeding 20 per cent by volume of said mixture and the volumetric ratio of any inert gas (including water vapor) present to oxygen in said mixture not exceeding 10:1 flowing said mixture through a reaction space at a temperature of 350 to 500° C. at such rate that 10 to 80 per cent of said oxygen is reacted, condensing effluent vapors to obtain a liquid product and recovering hydrogen peroxide from said product.

5. The process which comprises forming a gaseous mixture containing oxygen and the vapor of an alcohol selected from the group consisting of primary and secondary alcohols, said mixture containing 5 to 10 volumes of alcohol vapor for each volume of oxygen present, the quantity of oxygen present not exceeding 20 per cent by volume of said mixture and the volumetric ratio of any inert gas (including water vapor) present to oxygen in said mixture not exceeding 10:1, flowing said mixture through a reaction space at a temperature of 350 to 500° C. at such rate that 10 to 80 per cent of said oxygen is reacted, condensing effluent vapors to obtain a liquid product, adding water to said liquid product and thereafter separating hydrogen peroxide therefrom by distillation.

6. The process which comprises forming a gaseous mixture containing oxygen and the vapor of an alcohol selected from the group consisting of primary and secondary alcohols, said mixture containing 5 to 10 volumes of alcohol vapor for each volume of oxygen present, the quantity of oxygen present not exceeding 20 per cent by volume of said mixture, and the volumetric ratio of any inert gas (including water vapor) present to oxygen in said mixture not exceeding 10:1, flowing said mixture through a reaction space at a temperature of 350 to 500° C. at such rate that 10 to 80 per cent of said oxygen is reacted, condensing effluent vapors to obtain a liquid product, adding water either as vapor to the reaction mixture or to the reaction products, or both, in amount at least sufficient to dilute the hydrogen peroxide formed to a 50 per cent by weight solution, and in addition to form an azeotropic mixture with substantially all the unreacted alcohol in said liquid product, and thereafter fractionally distilling said liquid product to separate therefrom an aqueous hydrogen peroxide solution, carbonyl compound, and an azeotropic mixture of water and alcohol.

7. A cyclic process which comprises continuously mixing air with the vapors of an azeotropic mixture of water and an alcohol selected from the group consisting of primary and secondary alcohols containing from 1 to 10 carbon atoms in such proportion that said mixture contains not more than 20 per cent by volume of oxygen, about 2 to 50 volumes of alcohol to one volume of oxygen, and not more than 10 volumes of nitrogen and water vapor to one volume of oxygen, flowing said mixture through a reaction space at a temperature of about 350 to 500° C. at such rate that 10 to 80 per cent of the oxygen is reacted, condensing the effluent vapors, continuously adding water to the condensate, subjecting said condensate to continuous fractional distillation to separate therefrom aqueous hydrogen peroxide solution, carbonyl compound, and an azeotropic mixture of alcohol and water vapors, and recycling said azeotropic mixture.

8. The process of claim 3 in which the alcohol is isopropyl alcohol.

9. The process of claim 7 in which the alcohol is isopropyl alcohol.

10. The process of claim 3 in which the alcohol is secondary butanol.

11. The process of claim 3 in which the alcohol is cyclohexanol.

CHARLES ROBERTS HARRIS.

(References on following page)

REFERENCES CITED

The following references are of record in the file of this patent:

UNITED STATES PATENTS

| Number | Name | Date |
|---|---|---|
| 2,086,702 | Dreyfus | July 13, 1937 |
| 2,288,769 | Alleman et al. | July 7, 1942 |
| 2,376,257 | Lacomble | May 15, 1945 |

FOREIGN PATENTS

| Number | Country | Date |
|---|---|---|
| 540,534 | Great Britain | Oct. 21, 1941 |
| 541,110 | Great Britain | Nov. 13, 1941 |

OTHER REFERENCES

Lacomble, "Chemical Abstracts" (1944), page 1082.